United States Patent
Kieser et al.

(10) Patent No.: US 11,062,094 B2
(45) Date of Patent: Jul. 13, 2021

(54) SYSTEMS AND METHODS FOR AUTOMATICALLY DETECTING SENTIMENTS AND ASSIGNING AND ANALYZING QUANTITATE VALUES TO THE SENTIMENTS EXPRESSED IN TEXT

(71) Applicant: Language Logic LLC, Cincinnati, OH (US)

(72) Inventors: Rick Kieser, Cincinnati, OH (US); Charles Baylis, Aptos, CA (US); Serge Luyens, Brussels (BE)

(73) Assignee: LANGUAGE LOGIC, LLC, Cincinnati, OH (US)

( * ) Notice: Subject to any disclaimer, the term of this patent is extended or adjusted under 35 U.S.C. 154(b) by 167 days.

(21) Appl. No.: 16/405,297

(22) Filed: May 7, 2019

(65) Prior Publication Data
US 2020/0004816 A1 Jan. 2, 2020

Related U.S. Application Data

(60) Provisional application No. 62/691,180, filed on Jun. 28, 2018.

(51) Int. Cl.
*G06F 40/35* (2020.01)
*G06F 17/18* (2006.01)
(Continued)

(52) U.S. Cl.
CPC .............. *G06F 40/35* (2020.01); *G06F 17/18* (2013.01); *G10L 15/26* (2013.01); *G10L 25/63* (2013.01)

(58) Field of Classification Search
CPC .......... G06F 17/18; G06F 40/30; G06F 40/35; G10L 15/26; G10L 25/63
See application file for complete search history.

(56) References Cited

U.S. PATENT DOCUMENTS 4,388,491 A * 6/1983 Ohta ....................... G10L 25/90
704/207
5,640,490 A * 6/1997 Hansen ................... G10L 15/02
704/254
(Continued)

FOREIGN PATENT DOCUMENTS

WO 2016122532 A1 8/2016

OTHER PUBLICATIONS

J. Yi, T. Nasukawa, R. Bunescu and W. Niblack, "Sentiment analyzer: extracting sentiments about a given topic using natural language processing techniques," 2003, Third IEEE International Conference on Data Mining, pp. 427-434 (Year: 2003).*

(Continued)

*Primary Examiner* — Eric Yen
(74) *Attorney, Agent, or Firm* — Dinsmore & Shohl LLP

(57) ABSTRACT

A method of analyzing sentiments includes receiving one or more strings of text, identifying sentiments related to a first topic from the one or more strings of text, and assigning a sentiment score to each of the sentiments related to the first topic, where the sentiment score corresponds to a degree of positivity or negativity of a sentiment of the sentiments. The method further includes calculating an average sentiment score for the first topic based on the sentiment score for each of the sentiments related to the first topic, determining a percentile for the first topic based on a frequency of sentiments related to the first topic, where the percentile for the first topic is determined with respect to a maximum frequency of sentiments related to one or more other topics, and computing an X-Score based on the average sentiment score and the percentile of the first topic.

20 Claims, 11 Drawing Sheets

(51) Int. Cl.
*G10L 15/26* (2006.01)
*G10L 25/63* (2013.01)

(56) References Cited

U.S. PATENT DOCUMENTS

| | | | | |
|---|---|---|---|---|
| 5,819,217 | A * | 10/1998 | Raman | G10L 25/78 |
| | | | | 704/233 |
| 5,822,728 | A * | 10/1998 | Applebaum | G10L 15/08 |
| | | | | 704/254 |
| 7,996,210 | B2 | 8/2011 | Godbole et al. | |
| 8,296,168 | B2 | 10/2012 | Subrahmanian et al. | |
| 8,417,713 | B1 | 4/2013 | Blair-Goldensohn et al. | |
| 9,020,956 | B1 * | 4/2015 | Barr | G06F 16/951 |
| | | | | 707/748 |
| 9,064,181 | B1 * | 6/2015 | Hundemer | G10L 19/008 |
| 9,129,008 | B1 * | 9/2015 | Kuznetsov | G06F 16/313 |
| 9,135,242 | B1 * | 9/2015 | Wang | G06F 40/30 |
| 9,449,080 | B1 * | 9/2016 | Zhang | G06F 16/3331 |
| 9,569,510 | B2 | 2/2017 | Gou et al. | |
| 2006/0242040 | A1 * | 10/2006 | Rader | G06Q 40/06 |
| | | | | 705/35 |
| 2009/0112588 | A1 * | 4/2009 | Kummamuru | G10L 15/04 |
| | | | | 704/245 |
| 2009/0112892 | A1 * | 4/2009 | Cardie | G06F 16/38 |
| 2010/0275114 | A1 * | 10/2010 | Bastos dos Santos | |
| | | | | G06F 40/183 |
| | | | | 715/228 |
| 2010/0306192 | A1 * | 12/2010 | Kapur | G06F 16/9535 |
| | | | | 707/723 |
| 2012/0041937 | A1 * | 2/2012 | Dhillon | G06F 16/36 |
| | | | | 707/708 |
| 2012/0200567 | A1 * | 8/2012 | Mandel | G06T 11/206 |
| | | | | 345/420 |
| 2013/0018874 | A1 | 1/2013 | Qiao | |
| 2013/0054502 | A1 * | 2/2013 | Fano | G06F 16/248 |
| | | | | 706/46 |
| 2013/0297546 | A1 | 11/2013 | Woods-Holder | |
| 2015/0195406 | A1 | 7/2015 | Dwyer et al. | |
| 2015/0248409 | A1 | 9/2015 | Berube et al. | |
| 2015/0248424 | A1 * | 9/2015 | Berube | G06F 16/93 |
| | | | | 715/234 |
| 2015/0261859 | A1 | 9/2015 | Isensee et al. | |
| 2016/0350664 | A1 * | 12/2016 | Devarajan | G06Q 50/01 |
| 2017/0286429 | A1 * | 10/2017 | Lange | G06Q 30/0269 |
| 2017/0351676 | A1 * | 12/2017 | Allen | G06F 16/3323 |
| 2018/0260860 | A1 * | 9/2018 | Devanathan | G06F 40/30 |

OTHER PUBLICATIONS

International Search Report and Written Opinion of the International Searching Authority, dated Oct. 17, 2019, PCT.

* cited by examiner

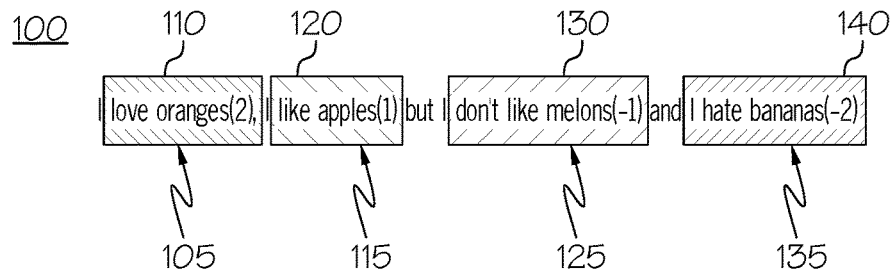
FIG. 4
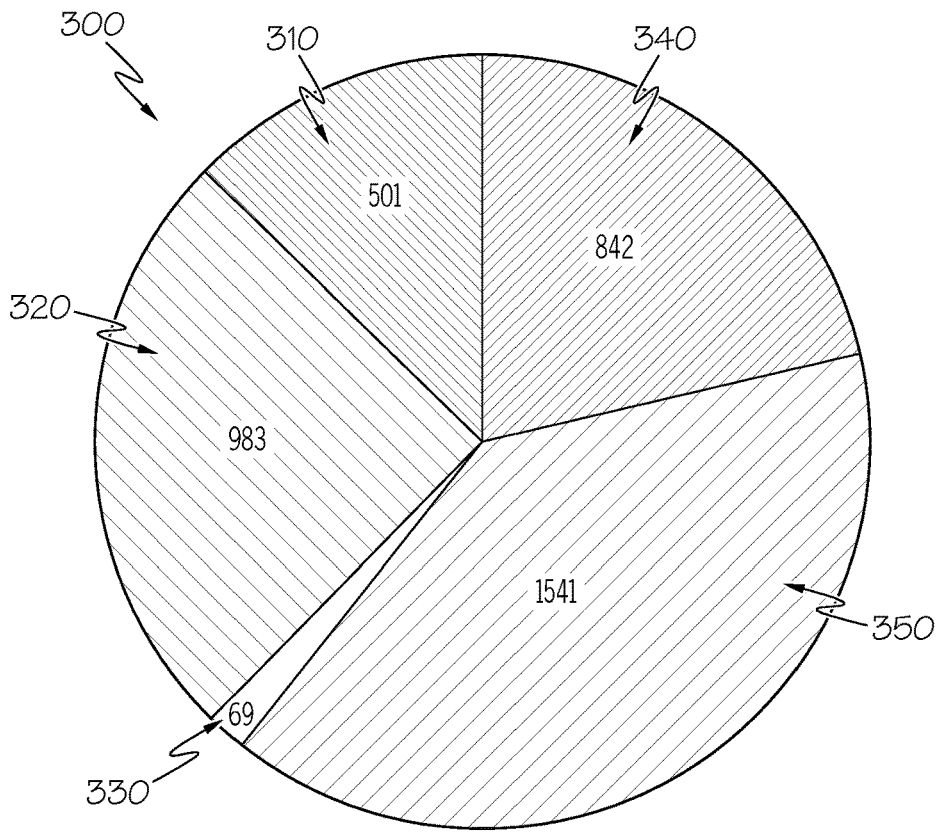
FIG. 5
FIG. 6

400

Gym is supposed to be open till 10pm but your stuff closed at 9:45, and one day I almost broke my leg b/c I was working out in the lifting room and light was turn off at 9:45 that I could not see the way to exit and fell. I'm very unhappy with the service and feels like nobody cares.
The overall cleanliness of the club is good and the staff is friendly. A few of the machines have been broken for a few months and have not been repaired. One of the bikes is missing a pedal and has a sharp edge where the pedal is suppose to be. One of the seats on another is broken. Both do not have a sign that say they are not functional, someone could possibly get hurt.
Sometimes the equipment is broken for months at a time and then there is no sign on the equipment that is broken. This is a big problem for me. Also there are no places to put water bottles or keys, so you have to sit them on the floor where you cannot reach them.
Floors need to be replaced. I actually regret I signed up here. It's very uncomfortable to work out at a place where you have to avoid looking down. It can be revolting. the whirlpool is broken and has been broken for several months. The main reason that I joined ACME was I would like to utilize the whirlpool to massage and relax my shoulder and back muscles and to alleviate my back pain and shoulder pain. However, the front desk staff has no idea when the whirlpool will be fixed and it seems nobody cares. It's very disappointing with this poor management and I regret to join ACME!

FIG. 7

| Topics | Frequency | Avg. Sentiment |
|---|---|---|
| staff | 155 | 0.4 |
| club | 147 | 0.1 |
| machine | 112 | -0.9 |
| locker | 108 | -1.1 |
| gym | 100 | 0 |
| equipment | 90 | -0.5 |
| acme | 80 | -0.1 |
| shower | 74 | -1.1 |
| room | 67 | -1 |
| people | 65 | -0.5 |

FIG. 8

| Topics | Frequency | Sentiment |
|---|---|---|
| tile | 11 | -1.5 |
| make | 7 | -1.4 |
| men | 9 | -1.3 |
| use | 9 | -1.3 |
| treadmill | 17 | -1.2 |
| locker | 108 | -1.1 |
| shower | 74 | -1.1 |
| bathroom | 60 | -1.1 |
| toilet | 16 | -1.1 |
| restroom | 14 | -1.1 |

FIG. 10

SYSTEMS AND METHODS FOR AUTOMATICALLY DETECTING SENTIMENTS AND ASSIGNING AND ANALYZING QUANTITATE VALUES TO THE SENTIMENTS EXPRESSED IN TEXT

CROSS-REFERENCE TO RELATED APPLICATION

The present application claims priority to U.S. Provisional Application No. 62/691,180 filed on Jun. 28, 2018 the entirety of the contents of which are incorporated herein by reference.

TECHNICAL FIELD

The present specification generally relates to systems and methods for automatically detecting, analyzing, and assigning quantitative values to sentiments expressed in text.

BACKGROUND

Sentiments and opinions regarding a topic, an activity, a product or the like may be captured in a variety of ways. In one example, surveys may be generated with questions that require a user to enter a numeric response such as how they feel about a product on a scale of 1-10. Questionnaires may also be generated where a user may enter written or verbal responses to closed or open-ended questions. An example of capturing and analyzing sentiments may include utilizing a system referred to as a "Net Promoter Score" (NPS). Net Promoter Score may request and quantify the percentage of customers who would recommend a product or service to others through feedback entered in the form of a numeric scale. Net Promoter Score is typically measured by asking the following questions: "How likely are you to recommend a business, an event, a food, a product, or the like to a friend or colleague?" Customers may rate businesses or experiences on a scale of 0-10. Respondents may be grouped in the following categories: a) Promoters (score 9-10), b) Passives (score 7-8), or c) Detractors (Score 0-6). Net Promoter Score is arrived at by subtracting the percentage of detractors from promoters. That is Net Promoter Score (NPS)=percentage Promoters−percentage Detractors. However, numerical ratings are generally limited to the question in which they are solicited from and open-ended comments may provide more detailed insight into a particular reason a customer is happy or unhappy with a company, but are not readily quantifiable and comparable.

SUMMARY

In one embodiment, a method of analyzing sentiments includes receiving, at a computing device, one or more strings of text, identifying, at the computing device, a plurality of sentiments related to a first topic from the one or more strings of text, and assigning a sentiment score to each of the plurality of sentiments related to the first topic, where the sentiment score corresponds to a degree of positivity or negativity of a sentiment of the plurality of sentiments. The method further includes calculating an average sentiment score for the first topic or one or more topics expressed in the one or more strings of text based on the sentiment score for each of the plurality of sentiments related to the first topic, determining a percentile for the first topic based on a frequency of sentiments related to the first topic, where the percentile for the first topic is determined with respect to a maximum and/or minimum frequency of sentiments related to one or more other topics, and computing an X-Score based on the average sentiment score and the percentile of the first topic.

In some embodiments, a system of analyzing sentiments includes a computing device having a processor and a non-transitory computer readable memory, and a machine-readable instruction set stored in the non-transitory computer readable memory of the controller. The machine-readable instruction set causes the system to perform at least the following when executed by the processor: receive one or more strings of text, identify a plurality of sentiments related to a first topic from the one or more strings of text, and assign a sentiment score to each of the plurality of sentiments related to the first topic, where the sentiment score corresponds to a degree of positivity or negativity of a sentiment of the plurality of sentiments. The machine-readable instruction set further causes the system to calculate an average sentiment score for the first topic based on the sentiment score for each of the plurality of sentiments related to the first topic, determine a percentile for the first topic based on a frequency of sentiments related to the first topic, where the percentile for the first topic is determined with respect to a maximum frequency of sentiments related to one or more other topics, and compute an X-Score based on the average sentiment score and the percentile of the first topic.

In some embodiments, a computer program for analyzing sentiments includes instructions which, when the program is executed by a computer, cause the computer to carry out steps including receiving, at a computing device, one or more strings of text, identifying, at the computing device, a plurality of sentiments related to a first topic from the one or more strings of text, assigning a sentiment score to each of the plurality of sentiments related to the first topic, where the sentiment score corresponds to a degree of positivity or negativity of a sentiment of the plurality of sentiments, calculating an average sentiment score for the first topic based on the sentiment score for each of the plurality of sentiments related to the first topic, determining a percentile for the first topic based on a frequency of sentiments related to the first topic, where the percentile for the first topic is determined with respect to a maximum frequency of sentiments related to one or more other topics, and computing an X-Score based on the average sentiment score and the percentile of the first topic.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts an example sentence annotated with discrete sentiment values and visualized with color highlights, according to one or more embodiments shown and described herein;

FIG. 5 depicts another example sample sentence, according to one or more embodiments shown and described herein;

FIG. 6 depicts an example visualization of the dataset in the form of a sentiment pie chart, according to one or more embodiments shown and described herein;

FIG. 7 depicts a display having an example set of individual data having only strong negative findings, according to one or more embodiments shown and described herein;

FIG. 8 depicts an example table for display on a display device where the table includes several topics and the display device includes an example set of individual data having only strong negative findings, according to one or more embodiments shown and described herein;

FIG. 10 depicts an aggregated table of topics sorted by average sentiment, according to one or more embodiments shown and described herein;

DETAILED DESCRIPTION

The systems and methods described herein relate to a set of techniques used to maximize the value of open-ended comment text data and extract as much information as possible in order to perfect the decision making process by assigning a quantitative value to the text which corresponds to sentiments. Embodiments of the present disclosure may be implemented using computer based systems. Text that is input into the system may be analyzed using a sentiment analysis process (e.g., sentiment logic 44). Sentiment analysis may use natural language processing, computational linguistics, and/or machine learning techniques in order to identify and quantify sentiments expressed by people regarding a specific topic. During the sentiment analysis process, topics may be extracted and numerical values (referred to herein as "sentiment scores") representing the attitude towards these topics are associated with each of them. For example, the topics may be topics extracted from an open-ended questionnaire solicited to members of a gym, owners of a product, employees of a company or the like. Each combination of a topic with an associated sentiment is referred to herein as a "finding."

Sentiment analysis is often referred to as the "Voice of the Customer." In some embodiments, sentiment analysis may be used to isolate areas of a business, establishment, or a consumer experience with a product or environment where improvements can be made or where actions may be taken to address an issue or highlight a benefit expressed in sentiments, for example of a consumer. Sentiment analysis may also be used to verify if the improvements and/or actions taken were fruitful. In other words, sentiment analysis may be used to compare sentiments across time periods, groups of consumers, various locations, or the like.

Various embodiments for automatically detecting, analyzing, and assigning quantitative values to sentiments expressed in text are now described herein below.

Figure 1:
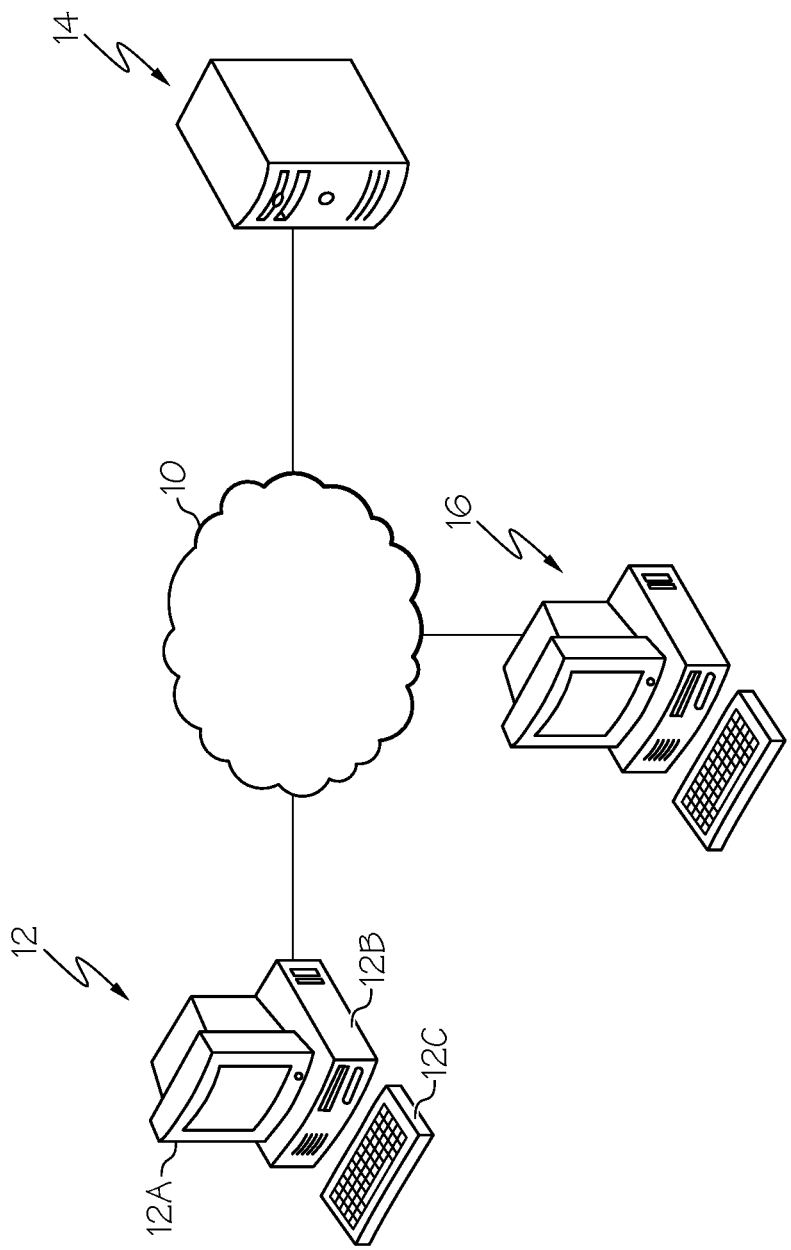
FIG. 1 schematically depicts an example computing network for automatically analyzing and quantifying sentiments, according to one or more embodiments shown and described herein.

Referring now to the drawings, FIG. 1 depicts an exemplary network 10, illustrating components for a system that automatically detects, analyzes, and assigns quantitative values to sentiments expressed in text, according to one or more embodiments shown and described herein. As illustrated in FIG. 1, a network 10 may include a wide area network, such as the internet, a local area network (LAN), a mobile communications network, a public service telephone network (PSTN) and/or other network and may be configured to electronically connect a user computing device 12, a computing device 14 for detecting, analyzing, and assigning quantitative values to sentiments expressed in text, and an administrator computing device 16.

The user computing device 12 may include a display device 12A, a processing unit 12B and an input device 12C, each of which may be communicatively coupled together and/or to the network 10. The user computing device 12 may be used to input open-ended comments from a user in the form or a video, audio, and/or text. More specifically, a user may be prompted with a questionnaire regarding a product, a business, an activity or a location and the user computing device 12 may collect the user's feedback and send it to the computing device 14 (or another computer connected to the network). The computing device 14 in response may detect, analyze, and assign quantitative values to sentiments expressed in textualized feedback and present, on a display device 12A of the user computing device 12 or a display device of an administrator computing device 16 or another display device connected to the network, a visual representation of the analyzed sentiments expressed about a topic.

Additionally, included in FIG. 1 is the administrator computing device 16. The administrator computing device 16 may be utilized to facilitate and/or oversee the solicitation, collection, analysis of sentiments, and the generation and presentation of X-Scores for topics expressed in the textual inputs. The administrator computing device 16 may further operate to provide an administrator or data analyst the ability to review and further analyze X-Score data. The administrator or data analyst may also select various combinations of topics or parameters for comparison such as the comparison of consumer comments between two different gym locations or the same gym location at different times.

It should be understood that while the user computing device 12 and the administrator computing device 16 are depicted as personal computers and the computing device 14 for generating content summaries is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 12, the computing device 14 for generating content summaries, and administrator computing device 16 may represent a plurality of computers, servers, databases, and the like.

Figure 2:
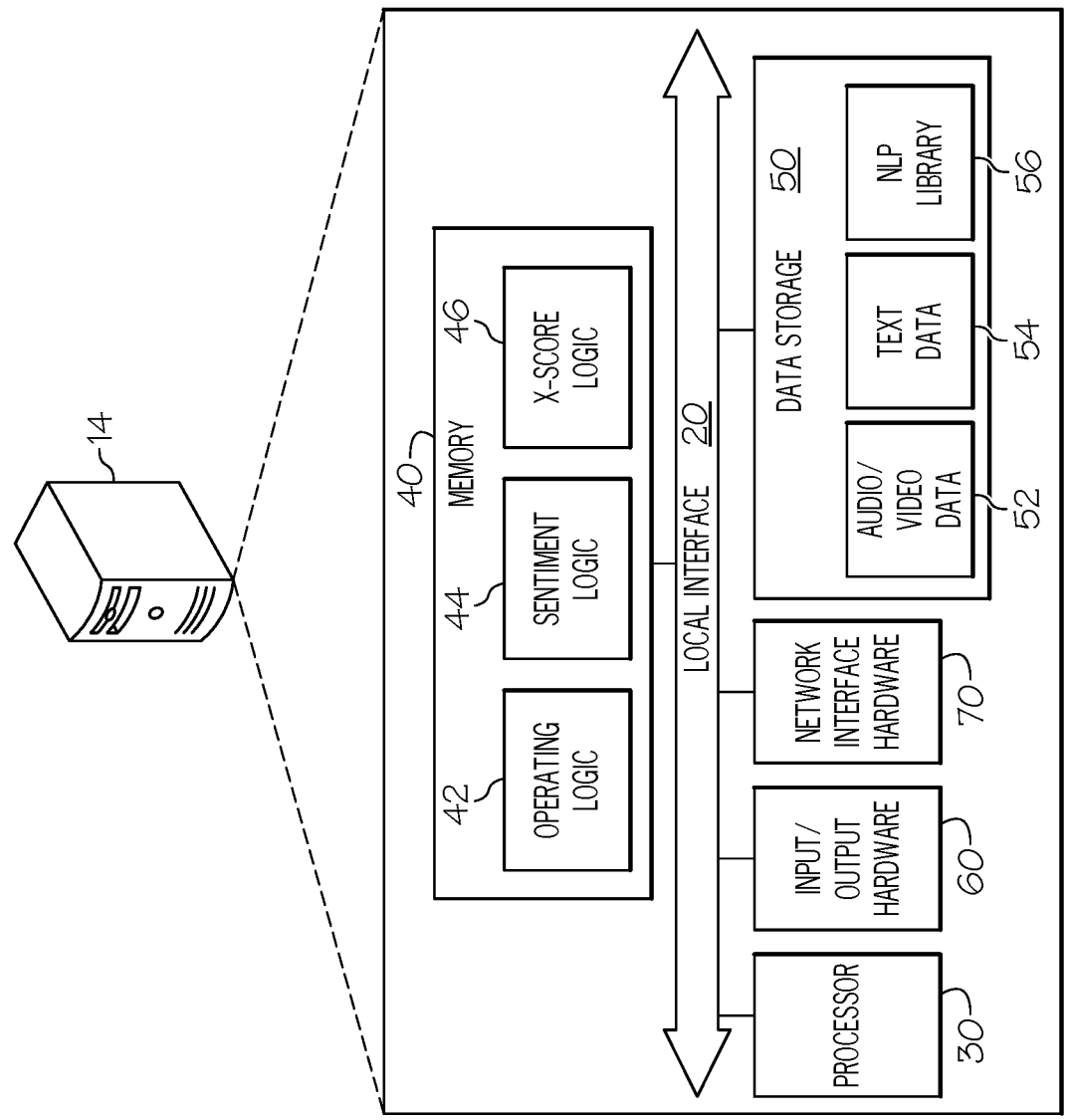
FIG. 2 schematically depicts an example computing device for analyzing sentiments, according to one or more embodiments shown and described herein.

FIG. 2 depicts the computing device 14 for automatically detecting, analyzing, and assigning quantitative values to sentiments expressed in text, from FIG. 1. The computing device 14 for automatically detecting, analyzing, and assigning quantitative values to sentiments expressed in text may utilize hardware, software, and/or firmware, according to embodiments shown and described herein. While in some embodiments, the computing device 14 may be configured as a general-purpose computer with the requisite hardware, software, and/or firmware, in some embodiments, the computing device 14 may be configured as a special purpose computer designed specifically for performing the functionality described herein.

As also illustrated in FIG. 2, the computing device 14 may include a local interface 20 communicatively connecting a processor 30, a memory component 40, a data storage component 50, input/output hardware 60, and network interface hardware 70. The local interface 20 may be implemented as a bus or other interface to facilitate communication among the components of the computing device 14.

The processor 30 may include any processing component(s) configured to receive and execute programming instructions (such as from the data storage component 50 and/or the memory component 40). The instructions may be in the form of a machine readable instruction set stored in the memory component 40 and/or the data storage component 50. The processor 30 may be an electric controller, an integrated circuit, a microchip, a computer, or any other computing device. The processor 30 is communicatively coupled to the other components of computing device 14 through the local interface 20 and/or the network interface hardware 70. Accordingly, the local interface 20 may communicatively couple any number of processors 30 with one another, and allow the components coupled to the local interface 20 to operate in a distributed computing environment. Specifically, each of the components may operate as a node that may send and/or receive data. Furthermore, while the embodiment depicted in FIG. 2 includes a single processor 30, some embodiments may include more than one processor 30.

The memory component 40 may be machine readable memory (which may also be referred to as a non-transitory processor readable memory). The memory component 40 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store the operating logic 42, the sentiment logic 44, and the X-Score logic 46 (each of which may be embodied as a computer program, firmware, or hardware, as an example).

The operating logic 42 may include an operating system and/or other software for managing components of the computing device 14. The sentiment logic 44 may be configured to identify sentiments and related topics from one or more strings of text and assign sentiment scores to the sentiments as described in more detail herein. The sentiment logic 44 may employ natural language processing or machine learning techniques. The natural language processing or machine learning techniques may be applied to words in a string of text to identify topics and related sentiments by analyzing words that come before and/or after a keyword indicating a positive or negative sentiment to add additional context to the sentiment and related topic, which may then be further categorized and assigned a sentiment score. The X-Score logic 46 may be configured to calculate average sentiment scores for a specific topic, determine a percentile (also referred to herein as "relative frequency"), and compute an X-Score for the topics and sentiments as described in more detail herein.

Still referring to FIG. 2, the data storage component 50 may reside local to and/or remote from the computing device 14 and may be configured to store one or more pieces of data for access by the computing device 14 and/or other components. As illustrated in FIG. 2, the data storage component 50 may store the audio/video data 52, text data 54, natural language processing, NLP Library 56, or other data elements utilized by the system. The audio/video data 52 may include collected data in the form of video and/or audio files of consumers or users expressing sentiments about one or more topics. As described in more detail herein, the audio/video data 52 may be analyzed to extract verbal sentiments about a topic and converted into one or more strings of text for sentiment analysis processing. The text data 54 may include collected data in the form of written responses from consumers or users expressing sentiments about one or more topics. The NLP Library 56 may include a Natural Language Toolkit for enabling the sentiment logic 44 processes such as text processing for topics and sentiments, and other related processes such as classification, tokenization, stemming, tagging, parsing, and semantic reasoning of the one or more strings of text.

The input/output hardware 60 may include a monitor, keyboard, mouse, printer, camera, microphone, speaker, and/or other device for receiving, sending, and/or presenting data. The network interface hardware 70 may include any wired or wireless networking hardware, such as a modem, LAN port, Wi-Fi card, WiMAX card, mobile communications hardware, and/or other hardware for communicating with other networks and/or devices.

It should also be understood that the components illustrated in FIG. 2 are merely exemplary and are not intended to limit the scope of this disclosure. More specifically, while the components in FIG. 2 are illustrated as residing within the computing device 14, this is merely an example. In some embodiments, one or more of the components may reside external to the computing device 14. Similarly, while FIG. 2 is directed to the computing device 14, other components such as the user computing device 12 and the administrator computing device 16 may include similar hardware, software, and/or firmware.

Embodiments for automatically detecting, analyzing, and assigning quantitative values to sentiments expressed in text will now be described.

Figure 3A:
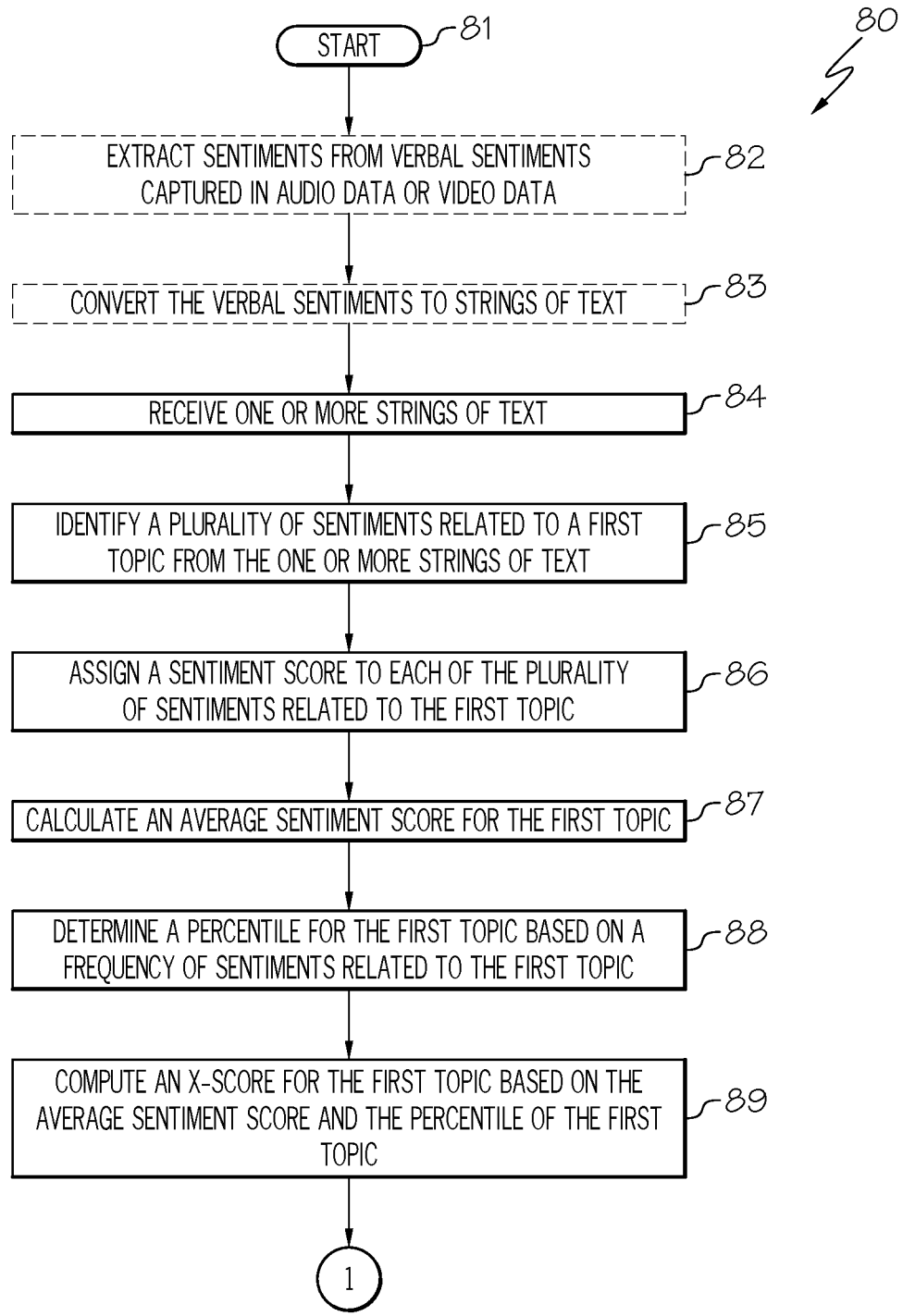
FIG. 3A depicts a flowchart of an example method of analyzing sentiments, according to one or more embodiments shown and described herein.
Figure 3B:
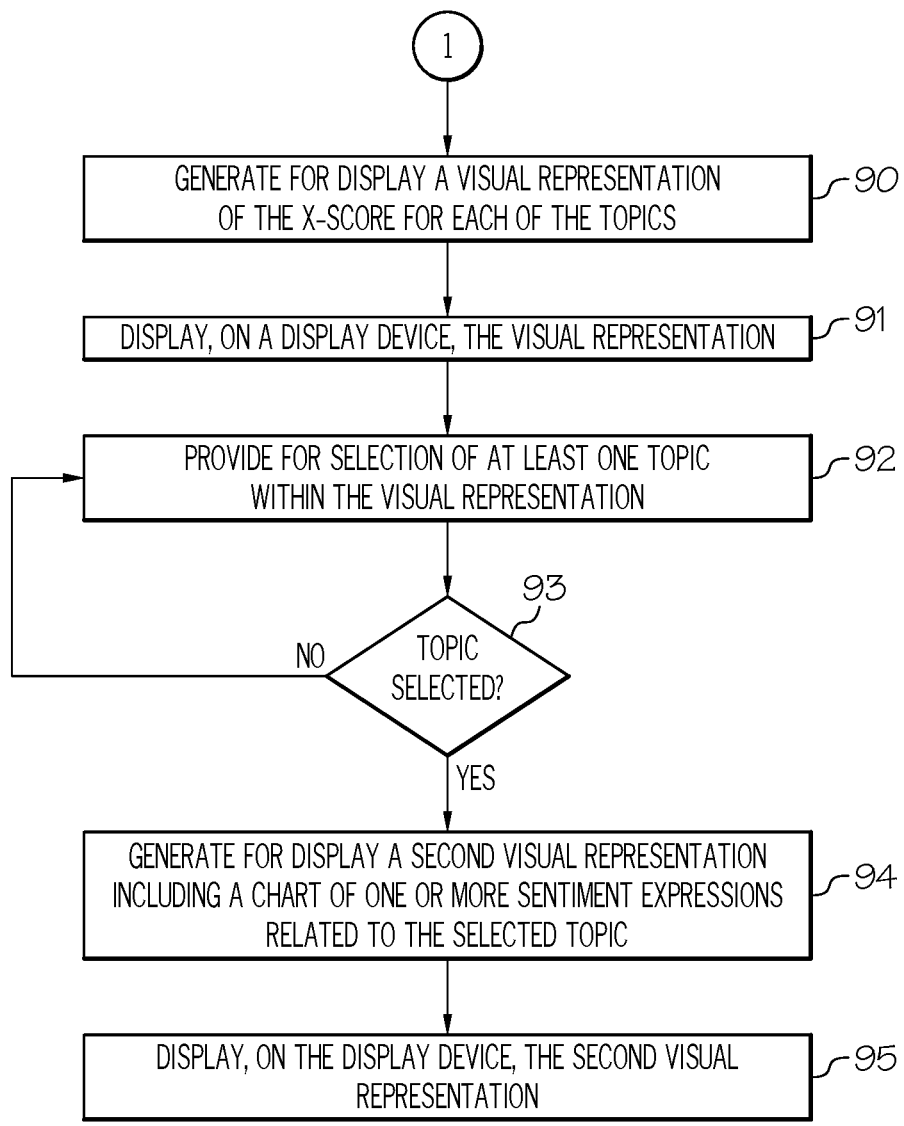
FIG. 3B further depicts the flowchart of the example method of analyzing sentiments, according to one or more embodiments shown and described herein.

Referring to FIGS. 3A and 3B, a flowchart 80 of an example method of analyzing sentiments, according to one or more embodiments shown and described herein is depicted. In some embodiments, the analysis of sentiments may begin with the collection of comments or feedback from consumers in the form of written text, spoken words, and/or video recordings. In some embodiments, the method of analyzing strings of text for sentiments may also include one or more processes for determining topics discussed in the strings of text. For example, techniques such as machine-learning and/or natural language processing like those discussed herein or other techniques may be utilized to generate a list of topics discussed within the strings of text. In some instances when determining the topics discussed within the strings of text to group the topics, a hypernym or synonym may be used to group related topics. That is, since the strings of text are received from open-ended responses there may be inconsistencies in the words chosen to express particular topics.

For example, a first open-ended response may discuss sentiments about a "locker room" while a second open-ended response may discuss sentiments about a "changing room" and another may discuss sentiments referring to a "dressing room." However, it may be known that all these sentiments were collected from patrons of a workout facility thus it may be inferred that each of the sentiments in fact relate to the same topic of a "locker room." As such, the sentiments for each may be grouped together under a first topic of "locker room." By way of another example, patrons may submit comments relating to the cleanliness of a "bench press" (e.g., a second topic), a "leg press" (e.g., a third topic), "free weights" (e.g., a fourth topic), or the like. As discussed in more detail herein these comments may be grouped together under a topic of "cleanliness of workout equipment," rather than separate topics. However, should additional detail be desired, a user may drill down into the sentiments corresponding to the topic of "cleanliness of workout equipment" as discussed in more detail herein.

Referring now specifically to FIGS. 3A and 3B, in the event sentiment data is collected in the form of verbal sentiments captured in audio/video data 52, the method of sentiment analysis may begin with extracting sentiments and converting the sentiments to strings of text. For example, after initiating the method at block 81, the system may extract sentiments from verbal sentiments captured in audio/video data 52 at block 82. The verbal sentiments within the audio/video data 52 may further be converted to strings of text at block 83. The system may utilize one or more known speech-to-text algorithms in combination with sentiment logic 44 to extract the one or more sentiments expressed in the audio/video data 52.

In some embodiments, spoken words that are converted to strings of text or unprocessed open-ended written text comments received as strings of text may be mined using sentiment analysis techniques to determine whether the strings of text include sentiments and further to extract the sentiments from the strings of text. Sentiment analysis techniques can generally be grouped into three categories: knowledge-based techniques, statistical methods, and hybrids approaches.

Knowledge-based techniques, in general, mine strings of text by searching for occurrences of affect words such as "happy," "like," "love," "hate," "sad," "disappointing," or the like. The affect words may be stored in word banks that were previously determined and classified as a word indicating a sentiment. The affect words may be previously classified as indicating a negative, positive, or neutral sentiment. In some instances, affect words may be assigned a value within their respective affinity classification (i.e., within their positive, negative or neutral grouping). For example, words such as "like," "love," "adore" or the like may compose a positive affinity classification and each of the words therein may be assigned a respective value. For example, the word "like" may have a value that is less than the words "love" and "adore."

Statistical methods of sentiment analysis may employ natural language processing and/or machine-learning techniques based on latent semantic analysis, support vector machines, a bag-of-words model, point mutual information, deep learning or other techniques and models. Natural language processing may employ methods which determine parts-of-speech of a string of text and extract nouns, verbs, adverbs, and adjectives as n-grams which may represent a sentiment (e.g., based on the adverb, adjective, verb combinations) about a particular topic (e.g., a noun, which may be further distinguished as either a subject noun or an object noun). The object noun may indicate a topic that corresponds to the sentiment expressed in the string of text. Natural language processing utilized for sentiment analysis mine strings of text for sentiment statements, topics, and in some instances determine and assign a sentiment score to the sentiment through an analysis of parts-of-speech, semantics, or the like of the strings of text. The parts-of-speech, semantics, or the like of strings of text may be determined based on a set of predefined rules or heuristics defined by the natural language processing.

Machine-learning techniques may construct and train a model for determining strings of text that express a sentiment and a related topic. To train a model, machine-learning techniques include training processes where patterns and inferences are constructed through exposure to numerous strings of text that include sentiments about topics. The training processes may be supervised or unsupervised. Supervised learning is the machine-learning task of training a model that maps an input to an output based on example input-output pairs where each example is a pair consisting of an input object (e.g., typically a vector) and a desired output value, which may also be referred to as the supervisory signal. Unsupervised learning is a branch of machine-learning that learns from test data that has not been labeled, classified or categorized. Unsupervised learning identifies commonalities in the data and reacts based on the presence or absence of such commonalities in each new piece of data. These methods of learning as well as other methods such as reinforcement learning processes may be used to train a machine-learning model for identifying and extracting sentiments in strings of text and/or assigning a sentiment score to sentiments expressed in the strings of text.

Hybrid approaches may include aspects of natural language processing and machine-learning techniques. That is, hybrid approaches may leverage elements from predetermined knowledge such as affect words which express a sentiment as well as ontologies and/or semantic networks to detect semantics that are expressed in a string of text. For example, syntactic sentence parsing may be used in conjunction with sentiment detection to correct or augment the assigned sentiment score. The sentiment score assigned to a phrase containing the word "like" may be assigned a value of +1. Sentence parsing may reveal that the word "like" has a related negating word such as "not", which in complex sentence structures may not be in close proximity to the word "like". In this case the polarity of the originally assigned sentiment score may be reversed to correct the result to a negative expression of sentiment.

Referring back to FIG. 3A, at block 84, the system may receive one or more strings of text. The strings of text may be from converted audio as described above or from a corpus of written comments by one or more users stored in a text document or an unstructured dataset. At block 85, a plurality of sentiments related to at least one topic discussed within the one or more strings of text may be identified. At block 85, the method may utilize one or more sentiment analysis techniques discussed herein above or other techniques developed or to be developed to identify sentiments expressed within a string of text. In some embodiments, for example and without limitation, a first machine-learning model may mine one or more strings of text for one or more topics and a second machine-learning model may mine the same one or more strings of text for sentiments corresponding to the one or more topics. Furthermore, one or more natural language processing implementing various rules, heuristics, and knowledge bases such as word banks may be implemented at block 85.

Examples of sentiments identified within strings of text are further shown and described with respect to FIGS. 4, 5, and 7. For example, a noun (e.g., an object noun identifying a topic) may be determined through semantic parsing of a string of text by utilizing one or more of the semantic analysis techniques discussed herein. Additionally, a noun phrase and or a descriptor may be identified within a proximity of the topic discussed in the string of text. This may be identified as the sentiment relating to the topic. In some embodiments, the method may iterate through one or more strings of text identifying a plurality of sentiments for a plurality of topics. Similar topics may be grouped together and their related sentiments may be stored in memory component 40 or the data storage component 50 for further analysis.

At block 86, a sentiment score is assigned to each of the sentiments related to a first topic. The sentiment score may be a value from a predefined range (i.e., a predefined sentiment score range). The predefined sentiment score range, for example, may be a range including {−2, −1, 0, +1, +2}. However, the scale may vary. In some systems continuous values between −1 (strong negative) and +1 (strong positive) may be used. However, a set of discrete sentiment scores may maximize the potential for statistical analysis of data. For example, the values of the predefined sentiment score range may be −2 (e.g., strong negative) to +2 (e.g., strong positive). In other words, for example −2 Strong Negative, −1 Negative, 0 Neutral, 1 Positive, and 2 Strong Positive may indicate the degree of negativity of the sentiment or the degree of positivity of the sentiment.

Determining and/or assigning a sentiment score to a sentiment may be accomplished through one or a variety of processes. One example process may include utilizing a predefined word bank where affect words are assigned predetermined values. For example, the affect word "like" may have a value of +1 such that when the affect word "like" appears in a string of text that string of text is assigned a sentiment score of +1. In some cases, the occurrence of an adverb, adjective, or another modifying part-of-speech in the string of text may increase or decrease the sentiment score by a relative value. For example, the word "really" may be associated with a relative value of 1. That is, when the string of text includes a phrase such as "really like" then the sentiment score assigned to the topic discussed in the string of text may be +2 (i.e., "like"=+1 and "really" increases the +1 to +2 by a relative value of 1). Whereas, if the string of text includes a phrase such as "really do not like" then the sentiment score assigned to the topic discussed in the string of text may be −2 (i.e., "like"=+1 and "really" increases the +1 to +2 by a relative value of 1, but the presence of phrase "do not" negates the sentiment score to a negative value).

In some embodiments, determining and/or assigning a sentiment score to a sentiment in a string of text may include a machine-learning model that is trained using a supervised learning process where known strings of text having predetermined sentiment scores are input into the machine-learning model. The machine-learning model may include a neural network which may predict a sentiment score for the string of text. Then, a loss function configured to receive the predicted sentiment score and the predetermined sentiment score may update the machine-learning model such that the neural network learns to better predict the correct sentiment score for the string of text expressing the sentiment in future iterations. The neural network may receive tens, hundreds, thousands or more training strings of text until the loss between the predicted sentiment score and the predetermined sentiment score is minimized to a predefined acceptable value. In other embodiments, a sentiment score may be assigned using rules-based sentence parsing and part of speech detection coupled with gazetteers of words and phrases pre-determined to express sentiment.

Turning to block 87 of flowchart 80 in FIGS. 3A and 3B, it is plausible that a topic may receive a varying degree of sentiments. For example, one user may feel that a product met all their needs, while another user may be impartial to the benefits the same product offers. As such, at block 87, an average sentiment score for the topic is calculated. Although the average sentiment score for a topic is calculated, the individual sentiment expressions and related sentiment scores may be stored in memory component 40 and/or the data storage component 50 for later analysis and/or review. In addition to calculating the average sentiment score, a frequency of sentiments for a topic may be determined. That is, a total number of sentiments related to a particular topic is determined.

At block 88, a percentile (or as also referred to herein as "relative frequency") for the first topic (and/or all the topics in a selected group of topics to be compared) is determined. For example, the percentile for the first topic may be determined by dividing its frequency of sentiments by the maximum number of sentiments for a topic within the group of topics being compared and multiplying the result by 100. That is, referring briefly to Table 1 depicted and described below, Topic A has a frequency of 15, which means there were 15 sentiments regarding Topic A. Additionally, Topic C, which is included in the group of topics being compared in Table 1, has a frequency of 20 which is also the maximum number of sentiments for a topic within the group of topics being compared. Therefore, the percentile of Topic A is (15/20)*100=75, that is the 75$^{th}$ Percentile. The percentile may be determined for each of the topics in a group being compared.

At block 89, the X-Score is computed. The X-Score provides a metric that removes sample size dependency when comparing topics and reduces noise in the analysis arising from topics having strong sentiments with low frequencies. The X-Score for a topic is computed by combining based on the average sentiment score and the percentile for that topic. The X-Score produces a value between −100 and +100, where the more negative value correlates to a higher degree of negativity in the sentiments and the more positive the value correlates to a higher degree of positivity in the sentiments expressed about the topic.

In some embodiments, the X-Score is computed by Equation 1, below.

$$Xscore_t = \frac{\overline{S_t} * P_t}{\max_{S}|\{S_r\}|}, \qquad \text{Eq. 1}$$

$\overline{S}_t$ is the average sentiment score for the first topic. $P_t$ is the percentile for the first topic.

$$\max_{S}|\{S_r\}|$$

is the maximum sentiment score within a predefined range of sentiment scores, $\{S_r\}$, available to assign at least one sentiment of the plurality of sentiments.

In some embodiments, the X-Score may be stored in memory and utilized by a further process. In some embodiments, the X-Score for one or more topics may be presented in a chart or table to assist a user in determining areas of improvement or identification of positive features. At block 90 of FIG. 3B, the system may generate for display a visual representation of the X-Score for each of the topics. For example, the topics may be topics extracted from an open-ended questionnaire solicited to members of a gym, owners of a product, employees of a company or the like. Visual representations may include bar charts (e.g., see FIGS. 11 and 12), or tables (e.g., Table 1), or the like. At block 91, the visual representation may be displayed on display device 12A. The visual representation may be configured to be interactive such that a user may drill down into specific sentiment expressions for a topic or other related data by selecting a topic. That is, at block 92, at least one topic within the visual representation may be configured for selection. The selection of a topic may be made through a touch sensitive display, a click of a mouse, a keyboard entry, a verbal command, or the like. At block 93, the system may determine whether a selection has been made. If a selection has not been made, the system may continuously monitor for an input selection. Otherwise, once a selection is made, at block 94, a second visual representation for display may be generated. The second visual representation may include a table (e.g., FIG. 9), a chart or other visual representation corresponding to the selected topic. At block 95, the system may display the second visual representation on the display device 12A. In some embodiments, for visualization purposes a specific color may be associated with each of the X-Score and/or sentiment scores, for example, ranging from dark red for strong negative to dark green for strong positive.

It should be understood that the aforementioned method may be carried out on one or more computing devices. Furthermore, the steps of the example method may be performed in a different order or in stages by different computing devices at various times. Additionally, the method may include additional steps not specifically described herein.

Turning now to FIGS. 4-12, examples of automatically detecting, analyzing, and assigning quantitative values to sentiments expressed in text will now be described. The following presents example strings of text being analyzed for sentiments and topics, scoring the sentiments, and computing and presenting the X-Score for a variety of topics.

Turning to FIG. 4, an example sentence 100 annotated with discrete sentiment scores (105, 115, 125, 135) and visualized with color highlights (110, 120, 130, 140) is depicted. In some embodiments, the system may provide for display a detailed analysis of a string of text such as sentence 100. For example, a discrete sentiment score 105 corresponding to a strong positive sentiment may be highlighted with a bold green highlight 110, a discrete sentiment score 115 corresponding to a positive sentiment may be highlighted with a light green highlight 120, a discrete sentiment score 125 corresponding to a negative sentiment may be highlighted with a light red highlight 130, and a discrete sentiment score 135 corresponding to a strong negative sentiment may be highlighted with a bold red highlight 140. It is understood that using colors to indicate the positive, negative, or neural degrees of a sentiment is only one example. Other visualization means may also be implemented. For example, various types of formatting such as font size, font type, font style, font color, font effects (e.g., bold, italics, underline, strikethrough and/or other font effects), or the like may be utilized. Furthermore, the word "love" being more emotionally charged than "like" may result in the assignment of a sentiment value of 2 whereas "like" may be valued with a 1.

As with any type of data, one can look at the individual (aka raw) data as well as the aggregate data. As described herein, a combined approach is proposed where users can use the aggregate data as a compass to provide them with a more refined view of the individual data.

Referring to FIG. 5, another example sample sentence 200 is depicted. The sample sentence 200 is from a dataset comprising people's sentiments towards a fitness center. As depicted in FIG. 5, a variety of reddish 210, 215 and greenish 220 highlights provide a visualization of words corresponding to more negative and more positive sentiments, respectively. The visualization provides a general bird's eye view of the sentiments within the string of text. In some embodiments, an aggregation of data will offer more insight into the cumulative sentiments within the dataset.

By looking at the aggregate data a general idea of the overall happiness or unhappiness of the sample being analyzed may be determined. For example, given a set of findings, wherein each sentiment is assigned a sentiment score that ranges between −2 and +2 an overall happiness or unhappiness score may be determined. To do so, the average sentiment score may be calculated and then rescaled so that it ranges between −100 and +100. This is referred to as the X-Score. For example, if every finding has a strong positive sentiment associated to it the X-Score would be +100. Likewise, if every finding has a strong negative sentiment associated to it, the X-Score would be −100. Furthermore, an X-Score averaging around the zero mark would mean that the sample is quite divided or overall generally neutral.

Referring to FIG. 6, an example visualization of the dataset in the form of a sentiment pie chart 300 is depicted. As depicted, the sentiment pie chart 300 depicts the frequencies of the five (5) sentiment scores. For example, there are 501 findings 310 having a strong positive sentiment associated with them, 983 findings 320 having a positive sentiment associated with them, 69 findings 330 having a neutral sentiment associated with them, 842 findings 340 having a strong negative sentiment associated with them, and 1541 findings 350 having a negative positive sentiment associated with them.

In some embodiments, the aggregated data, for example, displayed in a sentiment pie chart 300, may be filtered down to individual data by sentiment and/or topic. That is, for a particular sentiment, for example, a strong negative sentiment, filtering may be implemented to return (e.g., for display) the individual data having only strong negative findings. Referring to FIG. 7, a visual representation for display having an example set of individual data 400 having only strong negative findings 410 is depicted. This may provide a user of the system the ability to further examine the specific negative comments about a topic or group of topics.

The visual representation depicted in FIG. 6 may include many findings (e.g., tens, hundreds, or thousands of findings) related to the same subject (e.g., the fitness center) but have many subtopics (e.g., the staff, club, machines, lockers, gym, equipment, acme, shower, room, people, or the like). Therefore, in some embodiments, the topics may be aggregated. Referring to FIG. 8, an example table 500 for display is depicted. The table 500 depicts several topics 510, which occur many times in different findings. In some embodiments, the table 500 lists the top 10 topics 510 in terms of frequency 520 and displays the average sentiment score 530 for each of them. For example, the topic "locker" has been mentioned with a sentiment 108 times and the mentions indicate that people are not really happy about the lockers (i.e., locker has an average sentiment score of −1.1 on a scale from −2 to +2). Additionally, in some embodiments, the average sentiment score may be highlight as discussed above, where a color scale represents the degree of positivity or degree of negativity the average sentiment score is with respect to a predefined range (e.g., −2 to +2).

To know more about the bad score of the "locker" topic the list may be filtered for individual data on that topic. That is, a user may select a topic displayed on the display device 12A to receive further information. For example, similar to the paragraph in FIG. 7, where strong negative responses were filtered, the list of individual data by sentiment may be used to filter and present the sentiments related to the topic "locker." In some embodiments, the sentiments related to the topic "locker" may even be filtered based on their average sentiment score, for example, to view those with a negative response.

Figure 9:
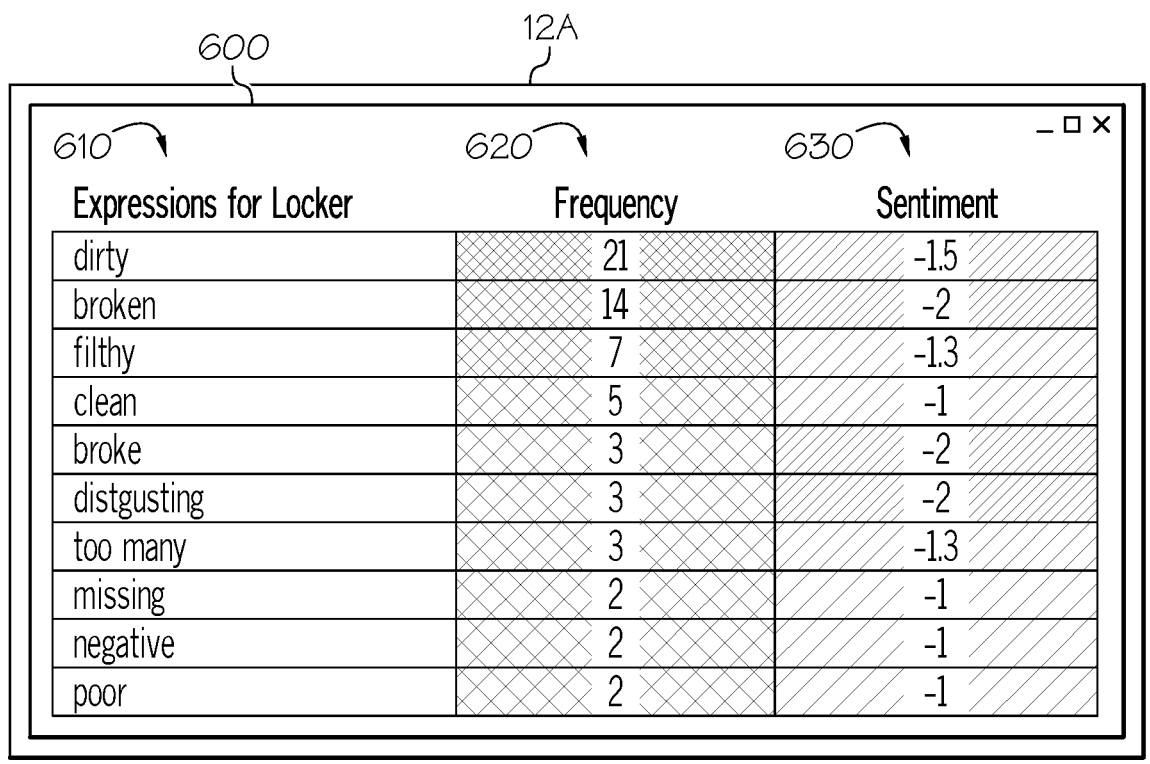
FIG. 9 depicts an example table for display having an aggregation of expressions for the topic "locker", according to one or more embodiments shown and described herein.

The sentiment expressions related to the topic "locker" may be aggregated. For example, expressions associated to the topic "locker" may be aggregated and presented by using natural language processing or machine learning techniques such as those discussed herein. Referring to FIG. 9, an example table 600 for display having an aggregation of expressions 610 for the topic "locker" is depicted. In some embodiments, the table 600 lists a number of expressions 610 in terms of frequency 620 and determines and presents a sentiment score 630 for each of them. For example, based on frequency at least two main problems with the lockers rise to the top. That is, the lockers are "dirty" and "broken." With this information, particular action to address the problems with the lockers may be determined. In some embodiments, the table 600 of expressions 610 aggregated from the findings may be filtered and/or sorted based on the average sentiment. However, as described herein, by computing an X-Score the sentiment of greatest criticality may be determined without the need to independently analyze the data with respect to frequency and then by sentiment score.

Referring to FIG. 10 an aggregated table 700 of topics 710 sorted by average sentiment score 730 is depicted. The table may also include frequency 720. Although the topics with strong negative sentiments may be sorted to the top of the list, a problem may arise in that the list prioritizes irrelevant topics with low frequencies, which can add noise to the analysis. Additionally, topics with high sentiment value averages are completely separated from their counterparts. As such, it may be difficult to get a one view summary of the things (e.g., topics) that are doing great and the areas that need urgent action. Therefore, a new metric referred to as the X-Score is presented herein.

The X-Score addresses the question of "Which are the most important topics?" That is, which are the topics that contribute most—whether positively or negatively—to the overall happiness or unhappiness of the sample? One solution to the problem is to multiply each topic's average sentiment value by its frequency. This has the benefit of pushing forward topics that matter, because many people talk about them or because they have a strong positive or negative sentiment and are mentioned by enough people to be taken into consideration. However, a problem with this approach is that the X-Scores will be sample size dependent. A sample of 10 respondents can generate a maximum X-Score of 2×10=20 and a sample of a 1000 respondents: 2×1000=2000. This makes the comparison between groups or time periods impractical.

Therefore, rather than multiplying each topic's average sentiment score by the frequency, the frequencies may be rescaled to a 1 to 100 scale or, in other words, a percentile rank for each topic's frequency (i.e., percentile value) may be determined. To be more precise, the average sentiment score of a topic may be multiplied by its percentile frequency (also referred to herein as "relative frequency") and divided by two in order to fit the results into a range of: −100 to +100. The X-Score will therefore always be a number between −100 and +100. That is, the higher the X-Score the more it corresponds to the overall happiness, the lower the X-Score the more it corresponds to overall unhappiness. Table 1 below provides an example.

TABLE 1

| Topic | Avg. Sentiment | Frequency | Percentile | X-Score [−100, +100] |
|---|---|---|---|---|
| A | 1.4 | 15 | 75.0 | 52.5 |
| B | 2 | 2 | 10.0 | 10 |
| C | 1.2 | 20 | 100.0 | 60 |
| D | −1.3 | 3 | 15.0 | −9.8 |
| E | 1 | 18 | 90.0 | 45 |
| Formulas: | | | =(Freq./Max Freq.) * 100 | =(Avg. Sentiment * Percentile)/2 |

In Table 1, Topic C has an average sentiment of 1.2 and a frequency of 20, and Topic C has a higher X-Score than Topic A although Topic A has a higher average sentiment and a lower frequency than Topic C. The power of the X-Score is twofold: (1) it enables the generation of powerful all-encompassing charts such those presented in FIGS. 11 and 12 and (2) it makes it possible to compare data across groups or time periods or groups.

The X-Score shows the key drivers of customer satisfaction and dissatisfaction. The X-Score is a customer experience metric that goes beyond existing measures such as NPS by providing the "why" behind customer satisfaction. Additionally, the X-Score is based on experience data found in raw verbatim comments and analyzed with Advanced Natural Language Processing (NLP) or machine learning algorithms. It automatically quantifies feelings expressed by consumers in unprocessed open-ended comments and scales them to their relative importance. For example, particular keywords such as fine, like, love, satisfactory, hate, terrible, or the like may be identified and used to identify the positive or negative nature of the sentiment being expressed. Additionally, the processing of the strings of text may annotate and extract keywords related to issues or compliments such as broken, dirty, helpful, kind, polite, clean, or the like, which may further indicate the positive or negative nature of the sentiment as well as indicate particular issues for which the sentiment is based upon. That is, if something is referred to as dirty it is generally considered a negative sentiment but it also provide additional context that allows a user to develop a targeted resolution such as the locker room for example needs to be cleaned. On the other hand, a statement that simply recites "like" or "dislike" or a questions that simply asks for a numeric value in response to a questions does not provide much context into what prompted the like or dislike. To achieve these goals, embodiments herein utilize natural language processing or machine learning techniques to identify words that come before and/or after a keyword indicating a positive or negative sentiment to add additional context to the sentiment, which may be further categorized and assigned a sentiment score.

For example, given the following 5 responses: i) "I loved the food" (+2), ii) "I hated the atmosphere" (−2), iii) "The service was good" (+1), "and the food excellent" (+2), iv) "Not happy with atmosphere" (−1), "and the price was right" (+1), and v) "Service was fine" (+0), "the food was great" (+2), "but the atmosphere was awful" (−2), the X-Scores may computed using Equation 1 above. The X-Scores, average sentiment scores and relative frequencies are presented in Table 2 below.

TABLE 2

| Topics | Total Frequency | Average Sentiment | Strong Negative (−2) | Negative (−1) | Neutral (0) | Positive (+1) | Strong Positive (+2) | Relative Frequency (Percentile) | X-Score |
|---|---|---|---|---|---|---|---|---|---|
| Food | 3 | 1.67 | | | | 1 | 2 | 100 | 83 |
| Atmosphere | 3 | −1.67 | 2 | 1 | | | | 100 | −83 |
| Service | 2 | 0.50 | | | 1 | 1 | | 67 | 17 |
| Price | 1 | 1.00 | | | | 1 | | 33 | 17 |

Figure 11:
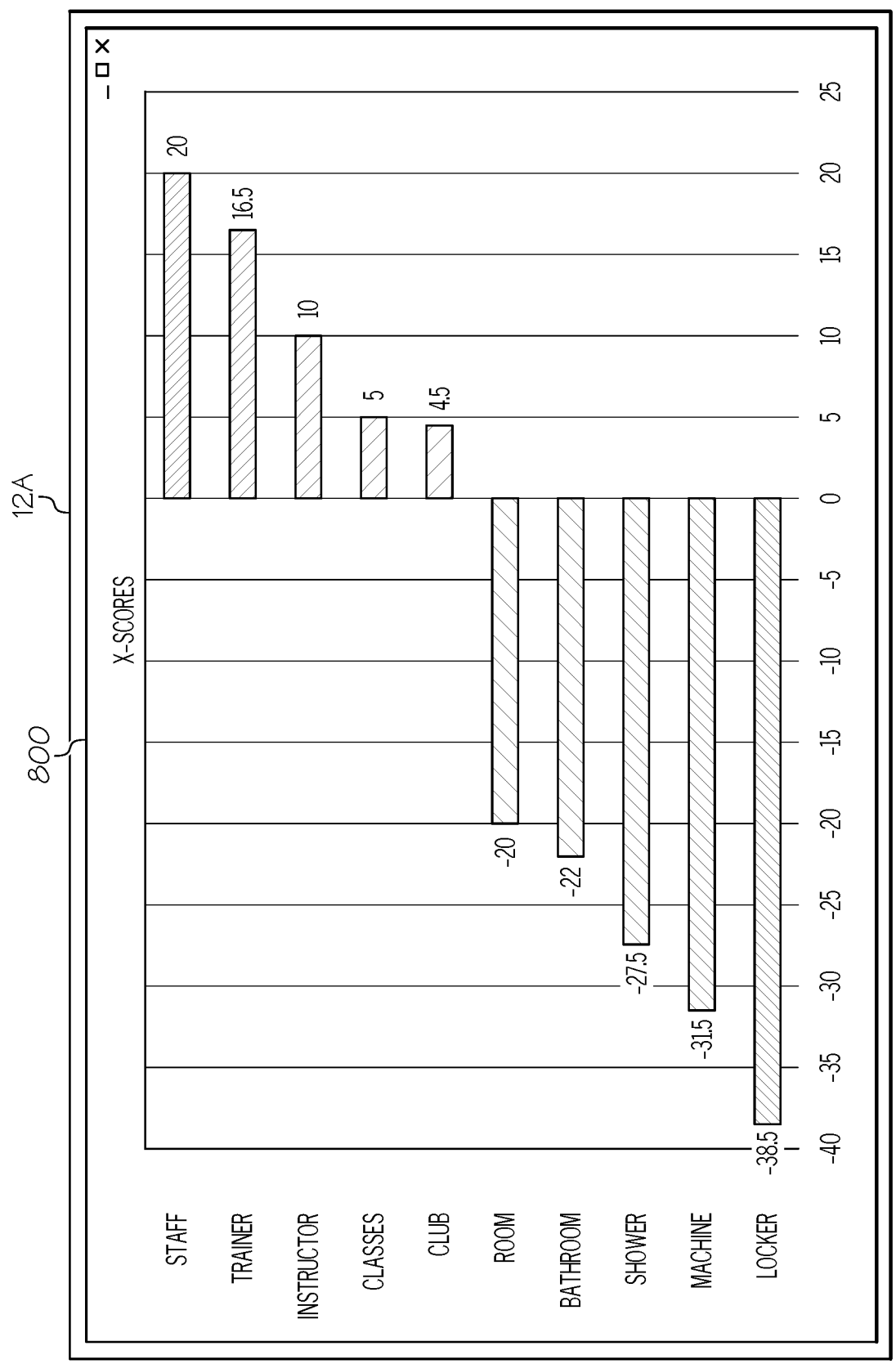
FIG. 11 depicts an example of a Topic X-Score chart plotting the top 5 and bottom 5 topics corresponding to open-ended feedback from patrons of a workout facility, according to one or more embodiments shown and described herein.

Referring to FIG. 11, an example of an X-Score chart including the top 5 topics and bottom 5 topics aggregated from comments about a workout facility is depicted. FIG. 11 further depicts an example visual representation displayed on a display device 12A. All the information is presented in a single bar chart 800. The topics presented in chart 800 represent feedback collected from patrons through open-ended responses about the workout facility. The patrons were not asked questions where a numerical response was solicited. Rather, the patrons were either prompted to provide written feedback about the facilities, services, staff or the like or prompted to provide feedback about any element of the workout facility they desired. The responses were processed, for example, utilizing a method for analyzing strings of text for sentiments depicted and described herein. Observations from the analysis of the sentiments and the subsequent quantification utilizing the X-Score technique include actionable insights into features or aspects of the workout facility that may be addressed or highlighted as a benefit. For example, nothing appears to be wrong with the personnel, therefore a conclusion may be drawn that no corrective actions are needed. In fact, the staff, trainer, instructor, classes are what people are the most happy with. However, urgent action needs to be taken with respect to particular facilities within the workout facility. For example, the lockers, the machines, the showers, the bathrooms as people are really unhappy there. People are almost twice more unhappy about the worst topic (−38.5) than what they are happy about, the best topic (+20). To determine more information about the particularly low X-Scores, in some embodiments, by selecting any of the bars within the chart a filter view of a filtered set of individual data (e.g., the source text as discussed above) and/or a filtered list of expressions may be obtained. This allows for further refinement and understanding into what action need to be taken to address the unhappiness.

Figure 12:
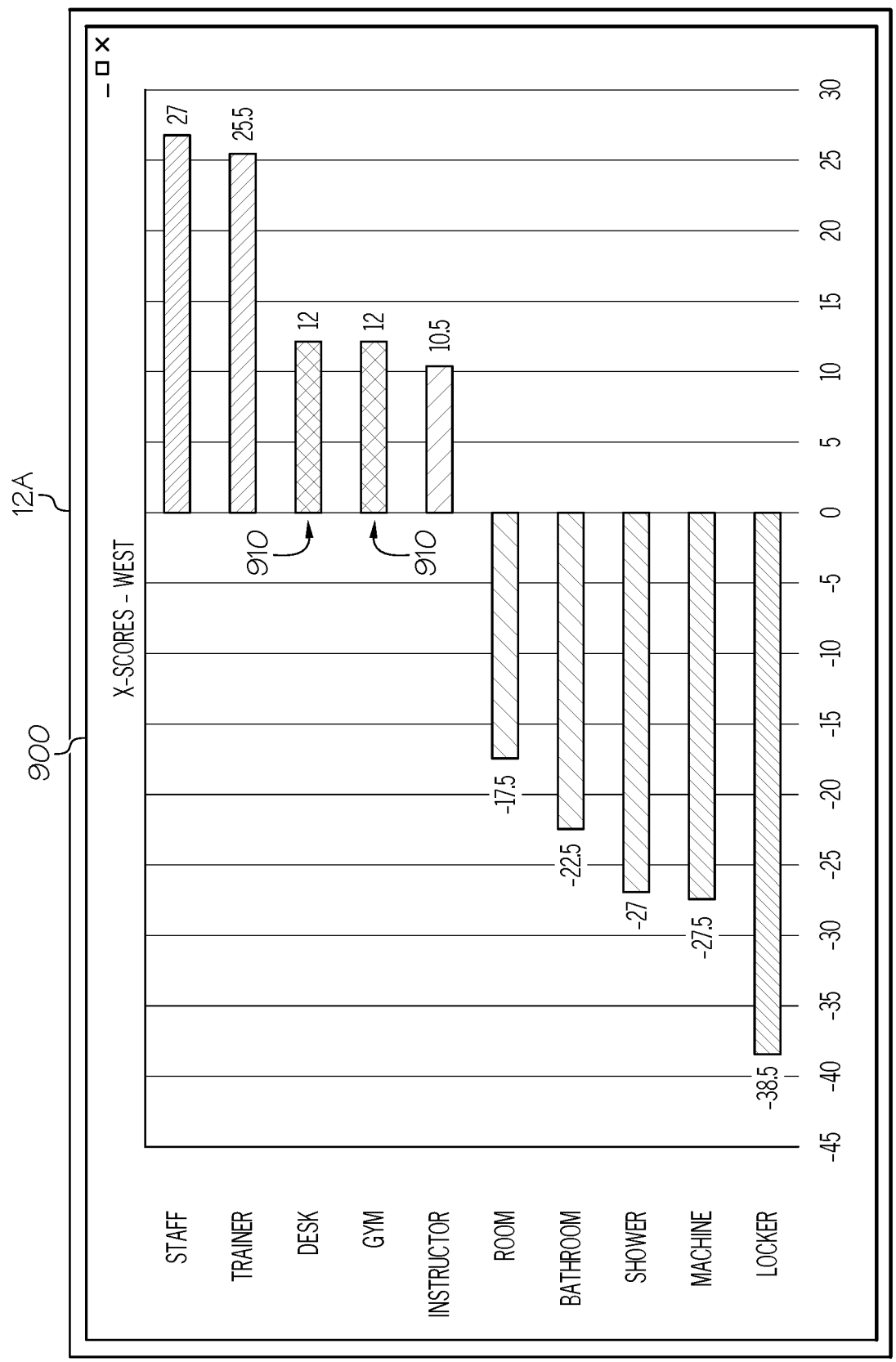
FIG. 12 depicts an example chart 900 where the top 5 and bottom 5 topics across different groups are compared, according to one or more embodiments shown and described herein.

Referring to FIG. 12, it may also be desired to view a particular region or compare results across two or more different regions. FIG. 12 further depicts an example visual representation displayed on a display device 12A. FIG. 12 depicts an example bar chart 900 where the top 5 and bottom 5 topics across different groups are compared. Additionally, topics that are not in one region but are present in another may be highlighted, for example, in yellow 910. As depicted in FIG. 12, it may be observed that the West region, contrary to the global sample user (as depicted in FIG. 11) is exceptionally happy about the desk and the gym. In some embodiments, in order to locate which topics vary the most across groups or times, a table may be generated that includes the group or time variable with an additional column containing the X-Score variance.

It should be understood that by using natural language processing and/or machine learning techniques sentiments may be identified and extracted from text, for example, comments provided by users. The extracted text, which may also be referred to as a finding, may then be assigned a sentiment value indicating a positive to negative sentiment. The findings may further be processed using natural language processing and/or machine learning techniques to determine a topic and possibly an expression (i.e., a sub-topic or issue). Each of these topics and expressions may be aggregated and a frequency as well as an average sentiment score may be determined. In order to compare results from various samples sets and between various quantities of respondents a frequency percentile value may be determined for each topic which is referred to as a Topic X-Score. The Topic X-Scores may be aggregated and presented in a variety of manners, such as charts based on a global data set, a comparison between groups, times, or locations or the like. This provides a system with the ability to identify important or urgent topics which require a response as well as identifying topics which people respond to in a positive manner.

It will be understood that, although the terms "first," "second," "third" etc. may be used herein to describe various elements, components, and/or sections, these elements, components, and/or sections should not be limited by these terms. Furthermore, the terms "first," "second," "third" etc. are not intended to connote a specific order. In some embodiments, the order in which the steps of a method are performed may be interchangeable to achieve the same results.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of analyzing sentiments, the method comprising:
   receiving, at a computing device, one or more strings of text;
   identifying, at the computing device, a plurality of sentiments related to a first topic from the one or more strings of text;

assigning a sentiment score to each of the plurality of sentiments related to the first topic, wherein each sentiment score corresponds to a degree of positivity or negativity of a sentiment of the plurality of sentiments;

calculating an average sentiment score for the first topic based on sentiment scores assigned to each of the plurality of sentiments related to the first topic;

determining a percentile for the first topic based on a frequency of sentiments related to the first topic, wherein the percentile for the first topic is determined with respect to a maximum frequency of sentiments related to one or more other topics; and computing an X-Score for the first topic based on the average sentiment score and the percentile of the first topic.

2. The method of claim 1, further comprising:

generating for display a visual representation of the X-Score for the first topic and one or more X-Scores for the one or more other topics; and displaying, on a display device, the visual representation.

3. The method of claim 2, further comprising:

providing for selection of at least one of the first topic and the one or more other topics within the visual representation, wherein selection of at least one of the first topic or the one or more other topics causes the display device to present a second visual representation including a chart of one or more sentiment expressions related to a selected topic.

4. The method of claim 3, wherein the visual representation includes at least one bar chart, wherein the X-Score for the first topic and one or more X-Scores for the one or more other topics are presented on the at least one bar chart.

5. The method of claim 3, further comprising:

associating a color with the X-Score for the first topic and one or more X-Scores for the one or more other topics, wherein a different color corresponds to different X-Score values.

6. The method of claim 1, wherein the X-Score is computed by:

$$Xscore_t = \frac{\overline{S_t} * P_t}{\max_S |\{S_r\}|},$$

where $\overline{S_t}$ is the average sentiment score for the first topic, $P_t$ is the percentile for the first topic, and $$\max_S |\{S_r\}|$$

is a maximum sentiment score value within a predefined range of sentiment scores, $\{S_r\}$, available to assign to at least one sentiment of the plurality of sentiments.

7. The method of claim 6, wherein the predefined range of sentiment scores is a range including: $\{-2, -1, 0, +1, +2\}$, wherein the sentiment score of $-2$ indicates a high degree of negativity of a sentiment and the sentiment score of $+2$ indicates a high degree of positivity of a sentiment.

8. The method of claim 1, further comprising:

extracting sentiments from verbal sentiments captured in audio data or video data; and converting the verbal sentiments to strings of text.

9. A system of analyzing sentiments comprising:

a computing device comprising:

a processor and a non-transitory computer readable memory; and a machine-readable instruction set stored in the non-transitory computer readable memory of the computing device that causes the system to perform at least the following when executed by the processor:

receive one or more strings of text;

identify a plurality of sentiments related to a first topic from the one or more strings of text;

assign a sentiment score to each of the plurality of sentiments related to the first topic, wherein each sentiment score corresponds to a degree of positivity or negativity of a sentiment of the plurality of sentiments;

calculate an average sentiment score for the first topic based on sentiment scores assigned to each of the plurality of sentiments related to the first topic;

determine a percentile for the first topic based on a frequency of sentiments related to the first topic, wherein the percentile for the first topic is determined with respect to a maximum frequency of sentiments related to one or more other topics; and compute an X-Score for the first topic based on the average sentiment score and the percentile of the first topic.

10. The system of claim 9, further comprising a display device communicatively coupled to the processor, wherein the machine-readable instruction set, when executed by the processor, further causes the system to:

generate for display a visual representation of the X-Score for the first topic and one or more X-Scores for the one or more other topics; and display, on the display device, the visual representation.

11. The system of claim 10, wherein the machine-readable instruction set, when executed by the processor, further causes the system to:

provide for selection of at least one of the first topic and the one or more other topics within the visual representation, wherein selection of at least one of the first topic or the one or more other topics causes the display device to present a second visual representation including a chart of one or more sentiment expressions related to a selected topic.

12. The system of claim 11, wherein the visual representation includes at least one bar chart, wherein the X-Score for the first topic and one or more X-Scores for the one or more other topics are presented on the at least one bar chart.

13. The system of claim 11, wherein the machine-readable instruction set, when executed by the processor, further causes the system to:

associate a color with the X-Score for the first topic and one or more X-Scores for the one or more other topics, wherein a different color corresponds to different X-Score values.

14. The system of claim 9, wherein the X-Score is computed by:

$$Xscore_t = \frac{\overline{S_t} * P_t}{\max_S |\{S_r\}|},$$

where $\overline{S}_t$ is the average sentiment score for the first topic, $P_t$ is the percentile for the first topic, and $$\max_{S}|\{S_r\}|$$

is a maximum sentiment score value within a predefined range of sentiment scores, $\{S_r\}$, available to assign to at least one sentiment of the plurality of sentiments.

15. The system of claim 14, wherein the predefined range of sentiment scores is a range including: $\{-2, -1, 0, +1, +2\}$, wherein the sentiment score of $-2$ indicates a high degree of negativity of a sentiment and the sentiment score of $+2$ indicates a high degree of positivity of a sentiment.

16. The system of claim 9, wherein the machine-readable instruction set, when executed by the processor, further causes the system to:
   extract sentiments from verbal sentiments captured in audio data or video data; and
   convert the verbal sentiments to strings of text.

17. A computer program product stored on a non-transitory processor readable memory for analyzing sentiments comprising instructions which, when the computer program is executed by a computer, cause the computer to carry out steps comprising:
   receiving one or more strings of text;
   identifying a plurality of sentiments related to a first topic from the one or more strings of text;
   assigning a sentiment score to each of the plurality of sentiments related to the first topic, wherein each sentiment score corresponds to a degree of positivity or negativity of a sentiment of the plurality of sentiments;
   calculating an average sentiment score for the first topic based on sentiment scores assigned to each of the plurality of sentiments related to the first topic;
   determining a percentile for the first topic based on a frequency of sentiments related to the first topic, wherein the percentile for the first topic is determined with respect to a maximum frequency of sentiments related to one or more other topics; and
   computing an X-Score for the first topic based on the average sentiment score and the percentile of the first topic.

18. The computer program product stored on the non-transitory processor readable memory of claim 17, further comprising instructions which, when the computer program is executed by the computer, cause the computer to carry out steps comprising:
   generating for display a visual representation of the X-Score for the first topic and one or more X-Scores for the one or more other topics; and
   displaying, on a display device, the visual representation.

19. The computer program product stored on the non-transitory processor readable memory of claim 18, further comprising instructions which, when the computer program is executed by the computer, cause the computer to carry out steps comprising:
   providing for selection of at least one of the first topic and the one or more other topics within the visual representation, wherein selection of at least one of the first topic or the one or more other topics causes the display device to present a second visual representation including a chart of one or more sentiment expressions related to a selected topic.

20. The computer program product stored on the non-transitory processor readable memory of claim 17, further comprising instructions which, when the computer program is executed by the computer, cause the computer to carry out steps comprising:
   extracting sentiments from verbal sentiments captured in audio data or video data; and
   converting the verbal sentiments to strings of text.

\* \* \* \* \*